Jan. 18, 1944.  T. K. COX  2,339,683
METHOD OF MAKING RETRACTILE CORDS
Filed June 5, 1940
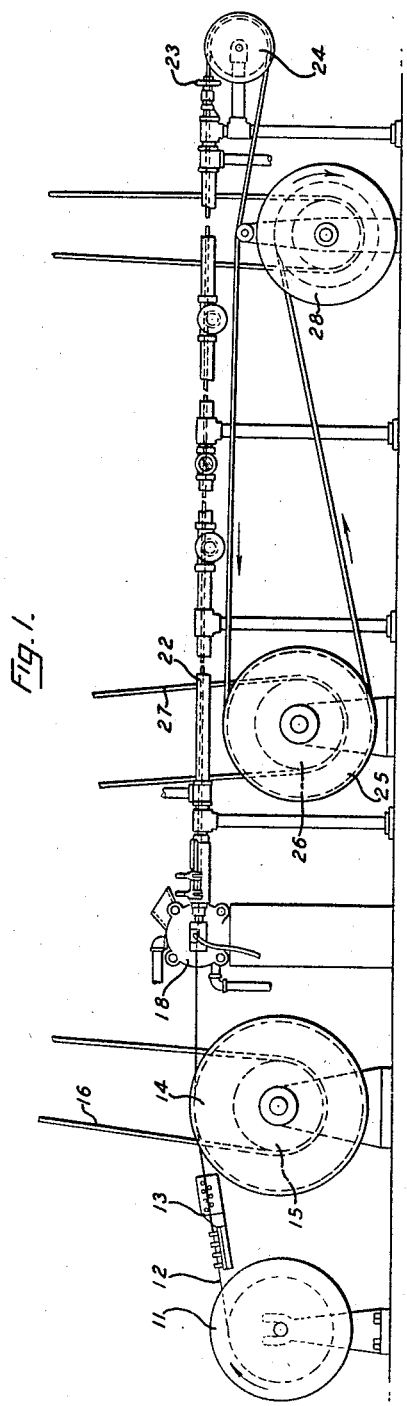
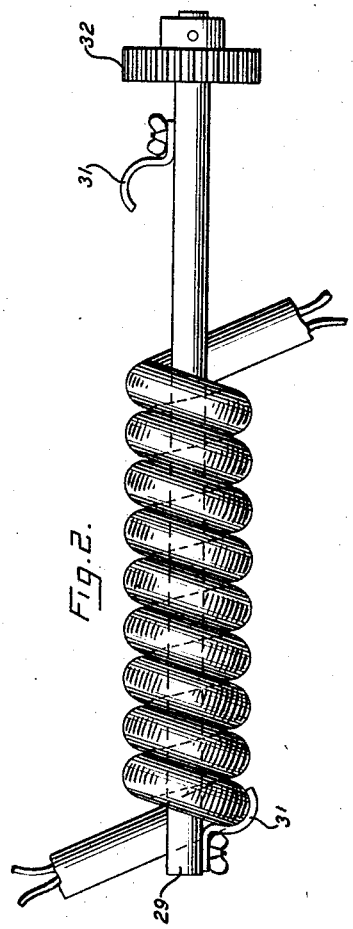
INVENTOR
T. K. COX
BY
ATTORNEY Patented Jan. 18, 1944

2,339,683

UNITED STATES PATENT OFFICE 2,339,683

METHOD OF MAKING RETRACTILE CORDS

Thomas K. Cox, Randallstown, Md., assignor to Western Electric Company, Incorporated, New York, N. Y., a corporation of New York Application June 5, 1940, Serial No. 338,881

2 Claims. (Cl. 18—53)

This invention relates to a method of making a retractile cord and more particularly to a method of making a rubber covered retractile cord.

In the manufacture of rubber covered retractile cords considerable difficulty has been experienced in many cases in vulcanizing a retractile cord in such a manner that the covering will not be distorted and the adjacent convolutions of the cord will not adhere together.

An object of the present invention is to provide an effective and efficient method of making a rubber covered retractile cord.

In accordance with one embodiment of the invention a rubber covered cord is first made in a continuous vulcanizing apparatus and vulcanized to a substantial degree. Thereafter a suitable length of such a vulcanized cord is wound in helical form upon a mandrel in which form the vulcanization is continued to set the rubber in the desired form.

A complete understanding of the nature and embodiment of the invention will be had by reference to the following description taken in conjunction with the accompanying drawing, in which Fig. 1 is a side elevation of a continuous vulcanizing apparatus which may be used in practicing the invention and Fig. 2 is a detail view of a section of a rubber covered cord wound on a mandrel for further vulcanization.

The apparatus which may be used in practising the invention is provided with a supply reel 11 from which one or more wires 12, to be covered, are drawn through a wire straightening device 13, of any desired form, by means of a capstan 14 around which the wire passes, the capstan being driven through a pulley 15 by means of a belt 16 connected to a suitable source of power (not shown) at a speed slightly greater than that of the wire to relieve tension on the wire during its passage through the vulcanzing chamber. From the capstan the wire or wires pass through a head 18 of an extrustion mechanism which is adapted to extrude a uniform coating of vulcanized insulating material on the wire or wires as they emerge from the extrusion mechanism 18. From the extrustion head the rubber covered cord passes through a vulcanizing chamber 22 in the form of an elongated tube to which steam is admitted at a pressure of about 60 lbs. per square inch to vulcanize the cord. The details of this mechanism will not be described herein since they are fully disclosed in the patent to L. F. Lamplough, No. 1,689,295, October 13, 1928. In the vulcanizing chamber the rubber covered cord may be vulcanized to a degree which may be best described as a commercial cure; that is, the cord may be vulcanized to the same degree that it would ordinarily be vulcanized if no further heat treatment were contemplated, although a lesser degree of vulcanization in this step may be used so long as the cord is vulcanized to such an extent that the rubber will not be readily distorted or adhere to adjacent rubber surfaces upon further vulcanization. From the vulcanizing chamber a cord passes through a seal 23 around a sheave 24 to a take-up capstan 25 driven through a pulley 26 from a belt 27 connected to any suitable source of power (not shown). From the take-up capstan 25 the cord may be wound upon a take-up reel 28. Sufficient time elapses during the travel of the cord around the sheave 24 and the capstan 25 for the insulating material to cool sufficiently to be wound on the take-up reel 28.

The second step of the invention comprises taking a suitable length of the rubber covered cord from a reel and winding it upon a mandrel 29. Suitable clips 31 may be provided on the mandrel for holding the ends of the cord. The end of the mandrel is shown provided with a gear 32 by means of which the mandrel may be rotated in a suitable mechanism (not shown) when winding the cord on the mandrel. A cord or number of cord lengths thus wound upon the mandrel are then placed in a vulcanizing chamber and subjected to steam under a pressure in the neighborhood of 60 lbs. per square inch to carry the vulcanization further and produce a permanent set of the cord into helical form. Satisfactory results have been obtained by vulcanizing the cord on a mandrel for a period of ten minutes. After heat treating the cord is cooled on the mandrel and after being cooled may be removed and it will yieldingly retain a helical form so that when a longitudinal tension is applied it will stretch, and retract when the tension is released. The retractility of the cord may be enhanced by winding the cord of a larger pitch, that is by leaving spaces between adjacent convolutions, then after the final vulcanization of the cord one end of the cord may be drawn through the helix to invert the cord. In this manner the retractility of the cord may be increased to such an extent that a definite pressure is exerted between the adjacent convolutions.

It will be understood that the nature and embodiment of the invention herein described is merely illustrative and that many changes and modifications may be made therein without departing from the spirit and scope of the invention.

What is claimed is:

1. A method of making a retractile cord which comprises continuously extruding a vulcanizable material on a conductor, passing said conductor directly into a vulcanizing chamber to continuously vulcanize the material thereon, then coiling the cord into a helical, retractile form, and heating the cord to set the cord in said form.

2. A method of making a retractile cord which comprises heating a conductor coated with vulcanizable material to cure the material, coiling the cord thus formed into a helical, retractile form, and heating said material to set the cord in said form.

THOMAS K. COX.